United States Patent
Esbensen et al.

(10) Patent No.: US 12,163,504 B2
(45) Date of Patent: Dec. 10, 2024

(54) WIND TURBINE OPERATIONAL METHOD FOR RESPONDING TO GRID DISTURBANCE

(71) Applicant: Siemens Gamesa Renewable Energy A/S, Brande (DK)

(72) Inventors: Thomas Esbensen, Herning (DK); Gustav Hoegh, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/007,815

(22) PCT Filed: Jun. 1, 2021

(86) PCT No.: PCT/EP2021/064645
§ 371 (c)(1),
(2) Date: Dec. 2, 2022

(87) PCT Pub. No.: WO2021/249822
PCT Pub. Date: Dec. 16, 2021

(65) Prior Publication Data
US 2023/0235726 A1    Jul. 27, 2023

(30) Foreign Application Priority Data
Jun. 10, 2020 (EP) .................... 20179272

(51) Int. Cl.
F03D 7/02    (2006.01)
(52) U.S. Cl.
CPC ......... F03D 7/0232 (2013.01); F03D 7/0224 (2013.01); F03D 7/0284 (2013.01);
(Continued)

(58) Field of Classification Search
CPC .... F03D 7/0232; F03D 7/0284; F03D 7/0224; F05B 2240/3052; F05B 2270/337; F05B 2270/328; F05B 2270/32
See application file for complete search history.

(56) References Cited

U.S. PATENT DOCUMENTS

2008/0150282 A1* 6/2008 Rebsdorf .............. F03D 7/0284
290/44
2012/0134814 A1    5/2012 McGrath et al.
(Continued)

FOREIGN PATENT DOCUMENTS

EP    1651865 A1    5/2006
EP    2835529 A1    2/2015
(Continued)

OTHER PUBLICATIONS

Fuentes J.A. et al: "International review of grid connection requirements related with voltage dips for wind farms"; Renewable Energy and Power Quality Journal; vol. 1; No. 5; Mar. 5, 2017 (Mar. 5, 2017); pp. 536-541; XP055827239.

*Primary Examiner* — David E Sosnowski
*Assistant Examiner* — Maxime M Adjagbe
(74) *Attorney, Agent, or Firm* — Schmeiser, Olsen & Watts LLP

(57) ABSTRACT

It is described a method of operating at least one adaptable airflow regulating system (13) of at least one rotor blade (15) of a wind turbine (1) connected to a utility grid (6), the method comprising: receiving information (10) regarding a grid disturbance; adapting, in particular during a disturbance duration, the airflow regulating system (13) based on the information (10), while the wind turbine (1) stays connected to the utility grid (6).

13 Claims, 2 Drawing Sheets

Figure 1:
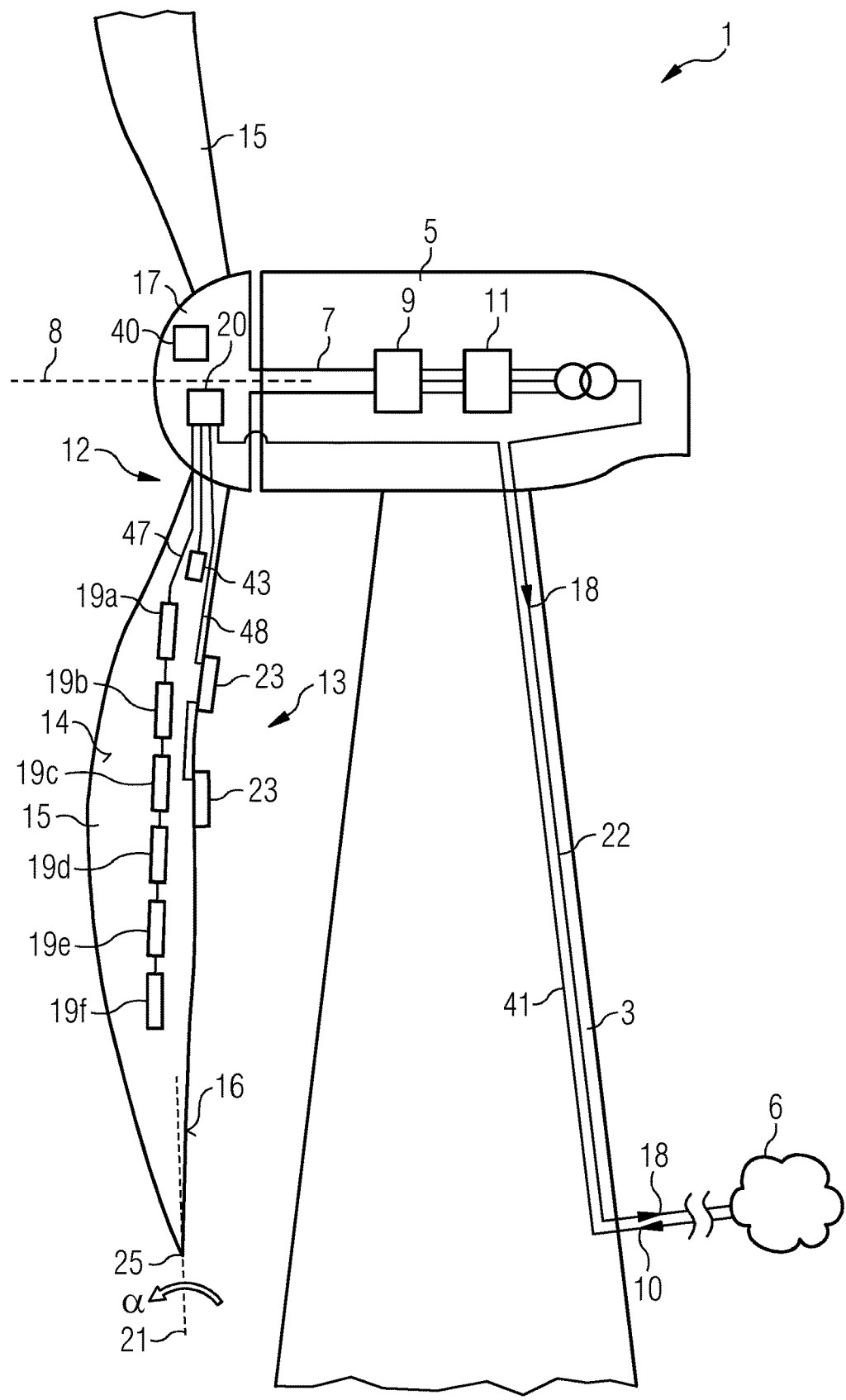

(52) U.S. Cl.
 CPC ... *F05B 2240/3052* (2020.08); *F05B 2270/32* (2013.01); *F05B 2270/327* (2013.01); *F05B 2270/328* (2013.01); *F05B 2270/335* (2013.01); *F05B 2270/337* (2013.01)

(56) References Cited

U.S. PATENT DOCUMENTS

2019/0148949 A1* 5/2019 Biris ................. F03D 7/0284
 290/44
2019/0368467 A1* 12/2019 Christensen ............ F03D 1/06

FOREIGN PATENT DOCUMENTS

EP       3029317 A1    6/2016
WO   WO 2005015012 A1   2/2005

\* cited by examiner

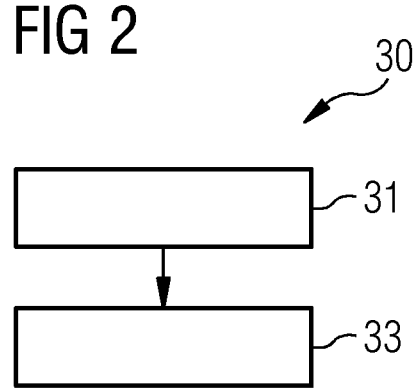

WIND TURBINE OPERATIONAL METHOD FOR RESPONDING TO GRID DISTURBANCE

CROSS-REFERENCE TO RELATED APPLICATIONS

This application claims priority to PCT Application No. PCT/EP2021/064645, having a filing date of Jun. 1, 2021, which claims priority to EP Application No.20179272.8, having a filing date of Jun. 10, 2020, the entire contents both of which are hereby incorporated by reference.

FIELD OF TECHNOLOGY

The following relates to a method and an arrangement of operating at least one adaptable airflow regulating system of at least one rotor blade of a wind turbine connected to a utility grid in case of a grid disturbance. Furthermore, the following relates to a wind turbine comprising the arrangement.

BACKGROUND

A wind turbine may be connected with plural other wind turbines to a utility grid, for example via a point of common connection and a wind park transformer. During normal operation the utility grid may have a nominal voltage and a nominal frequency. For example, in case of a fault in one or more components of the utility grid, the grid may experience a disturbance, such as a grid voltage drop, which may even go down to zero volt.

Nowadays, grid codes for wind power integration may require that the wind turbines stay connected during grid faults, even when the grid voltage drops down to zero. Furthermore, the wind turbines may also be required to inject reactive current in proportion to the voltage drop. In particular, wind turbines may be required to comply with the standard IEC 61400-1 defining load cases for grid disturbances, in particular grid drops (DLC 2.1).

Grid faults may be a detected grid drop during the operation of the wind turbines. A grid drop may cause the output power of the wind turbine to rapidly go to zero. This also includes that the mechanical torque is rapidly removed from the generator, giving a step-like change in loading, inducing high load cycles in the structure and may drive the rotor towards overspeed. The equilibrium point (operating point of the turbine) just before the grid drop may rely on that that the rotor can deliver the mechanical torque to the electrical system to balance the rotational speed. Whenever the counter-torque from the generator is suddenly removed (for example in a case of a utility grid voltage drop), the torque surplus effects an acceleration of the rotor. This may involve dangerous situations and risk of damage of wind turbine components.

Conventionally, a control method may have pitched the wind turbine blades, i.e. changed the pitch angle of the wind turbine blade in order to reduce the risk of acceleration of the rotor above a threshold of rotational speed. Therein, it may take a while for the control system to pitch out to limit the input power and stop the acceleration.

Some grid codes also require that power production is resumed close to a pre-fault shortly after the grid is returned to the normal operating state with little or no allowance for oscillations in the power production after a grid fault event. Therefore, the mechanical torque from the generator is rapidly re-established (i.e. meaning increased to a pre-fault value) and the control system must now pitch in the rotor blades to the re-established torque from the rotor.

Conventionally, the pitch angle of at least one rotor blade may have been changed in case of a voltage drop. Thereby, the requirements of a grid fault right through (GFRT) may have been met. Conventionally, the wind turbine blades have started pitching out of the wind as early as possible to avoid an overspeed of the rotor. The so-called pitch kick function introduces a fast change in the pitch angle in the positive direction when triggered, i.e. meaning to increase the pitch angle.

It has however been observed that pitching the blades in case of a voltage drop does not in all situations provide a reliable and safe operation. Further, it might have been observed that pitching, particular on large turbines, is too slow to adjust the driving torque resulting in undesired variations in rotor speed. Variation can both be above nominal speed (overspeed is a severe example of speed variation) but also below nominal speed when torque is re-established. The latter is problematic as speeds below nominal reduces the turbines power production capabilities.

Furthermore, applying pitching the rotor blades may have a negative impact on the lifetime of the pitching equipment, when a high number of grid disturbances occur. Furthermore, pitching the rotor blades may not be fast enough to appropriately ensure that an overspeed of the rotor is avoided.

Thus, there may be a need for a method and a corresponding arrangement for ensuring safe and reliable operation of the wind turbine in case of a utility grid disturbance, in particular a utility grid voltage drop. Furthermore, there may be a need for a method and an arrangement for operating a wind turbine, wherein the response time in case of a utility grid voltage drop may be improved.

SUMMARY

According to an embodiment of the present invention it is provided a method of operating at least one adaptable airflow regulating system (also referred to as add-on, e.g. lift regulating means, e.g. comprising an aerodynamically active surface changeable in position and/or orientation relative to an outer airfoil of the blade) of at least one rotor blade of a wind turbine connected to a utility grid, the method comprising: receiving information regarding a grid disturbance; adapting, in particular during a disturbance duration, the airflow regulating system based on the information, while the wind turbine stays connected to the utility grid, wherein controlling the airflow regulating system comprises: moving position and/or orientation of at least one aerodynamically active surface of the airflow regulating system relative to an airfoil portion of the rotor blade.

The method may partly be implemented in software and/or hardware. The method may for example be performed (in part) by a software module of a wind turbine controller. The adaptable airflow regulating system may comprise one or more components which are arranged at or close to airfoil portions of the rotor blade. The airflow regulating system may for example comprise a spoiler, which may in particular comprise several segments which may be arranged along a longitudinal direction of the rotor blade, for example at a suction side of the rotor blade airfoil. Furthermore, alternatively or additionally, the airflow regulating system may comprise one or more flaps which are for example mounted close to or at a trailing edge of the rotor blade.

The airflow regulating system is adaptable in the sense that the aerodynamic properties of the airflow regulating system, in particular in conjunction with the airfoil portions of the rotor blade, is changeable. For example, the lift force or thrust force to which the rotor blade is subjected to when wind impacts on it and when it rotates, may be changeable due to particular adaptation of the airflow regulating system. Thereby, the airflow regulating system may be set in one or more different states. For example, when the airflow regulating system comprises a number of segments, those individual segments may be individually controlled to be in an off-state or an on-state involving for example changing position and/or orientation of at least one active surface portion relative to the rotor blade airfoil. In other embodiments, the adaptation may be in a continuous manner, in that at least one active surface portion may be continuously changed in orientation and/or position relative to the rotor blade airfoil. The airflow regulating system may also be referred to as an active add-on.

For adapting the airflow regulating system, meaning setting it into different states, for example a pneumatic system may be utilized. In one embodiment, the airflow regulating system may comprise a spoiler which may be placed on a suction side of the rotor blade. The airflow regulating system may also comprise one or more vortex generators, for example placed in the streamline behind the spoiler as seen from the leading edge. The spoiler or spoilers may be activated using a pressure hose placed under the active surface (such as a flap) which upon inflation of air being pushed into the hose may cause the active surface to rise above the blade surface. When the spoiler or spoilers are activated, for example tilted upwards to protrude from the rotor blade airfoil, a quick reduction of the blade load (and thus aerodynamic lift force) may be effected by initiating at least a localized stall on the airflow across the rotor blade.

By adapting the airflow regulating system (for example setting it in one or more of different states), the lifting force of the combination of the rotor blade airfoil and the adapted airflow regulating system may be changed. In turn, when the lifting force is reduced, also the aerodynamic torque the wind exerts on the rotor blade is reduced. Therefore, also the acceleration of the rotor is reduced, in particular may be reduced by for example between 10% and 70% of the torque as was present prior to the grid disturbance.

Controlling the airflow regulating system may for example comprise sending appropriate control signals to a pneumatic system which upon receiving the signals may generate pneumatic pressure in order to inflate (or deflate) for example a hose which is, upon inflation or deflation, moving an active surface portion, for example in case of a spoiler. When the airflow regulating system comprises several segments, different individual control signals may be supplied to the individual segments of the airflow regulating system. For example, different segments may be controlled in a different manner. One or more may be turned on (involving tilting out respective active surface) and one or more other may be turned off. The control may be such that the lifting force due to aerodynamics or due to the airflow is reduced.

Receiving the information may involve receiving information from a utility grid operator or/and receiving information regarding an electrical property of the grid from a utility grid operator or from a measurement system. Furthermore, receiving the information may involve or comprise receiving information regarding measurement values of the utility grid voltage. The method may also involve or comprise to detect the grid disturbance, for example by evaluating the measurement values regarding the utility grid voltage. The grid disturbance may for example comprise a voltage drop of the utility grid voltage of between 10% and 100% of a nominal utility grid voltage. The adapting the airflow regulating system may only be performed, if the utility grid voltage drop is above an application specific threshold.

The grid disturbance may be any grid disturbance which may require to unload the rotor blade, i.e. reduce the aerodynamic lift of the rotor blade or to reduce the aerodynamic torque as generated by the impacting wind on the rotor blade. The grid disturbance may for example last between 0.1 s and 10 s, in particular between 1 s and 5 s. During the entire length of the grid disturbance, for example during a timespan of up to 10 s, the wind turbine may be staying connected to the utility grid. During the grid disturbance, in particular voltage drop, the wind turbine output power may be regulated to zero. Furthermore, the generator torque which in a normal operation counteracts the aerodynamic torque as exerted by the rotor, may also be regulated substantially to zero.

The airflow regulating system may be adjusted in a direction to reduce the lift of the rotor blade and therefore also reduce the aerodynamic torque. Therefore, acceleration of the rotor may be reduced. Other measures may additionally or alternatively be employed to reduce the rotor blade lift, for example also involving changing the pitch angle of the rotor blade(s). However, these measures may only be applied in a secondary stage and may for example not be as fast as adapting the airflow regulating system. Thereby, a reliable method is provided for responding to utility grid voltage drops and in general any grid disturbance which may require to reduce the lift of the rotor blade.

The big benefit of active devices may be to be able to quickly reduce (e.g. during grid voltage drop) and re-establish (e.g. after grid disturbance is over) the driving torque, as required, faster than pitching.

Moving the position and/or orientation of the at least one aerodynamically active surface of the airflow regulating system relative to an airfoil portion of the rotor blade may be effected by appropriately controlling a pneumatic system for example or a piezoelectric system or a combination of the same or a hydraulic system depending on the application and the particular implementation of the flow regulating device or system. Moving for example the orientation of the aerodynamically active surface into an on-state (e.g. partly or completely swivelling out) may for example cause a localized stall of an airflow. Setting the active surface in an off-state may establish an airflow across the active surface which may be shaped according to the normal airfoil surface shape of the rotor blade.

According to an embodiment of the present invention, the grid disturbance comprises a grid voltage drop of the grid voltage, in particular of between 0% and 50% of a nominal grid voltage, in particular for a duration between 0.1 s and 10 s, wherein adapting the airflow regulating system is performed, only if grid voltage drop is greater than a threshold.

The grid voltage drop may occur with a very high rate, such as for example in between 0.1 s and 10 ms from the nominal grid voltage to 0 V. Neither pitching nor active devices (e.g. add-on) can react that fast, i.e. the response in systems may always lack behind and there will be an increase in rotor speed. However, the faster the response as provided by operating the add-on the less increase in rotor speed. The active devices (e.g. add-on) can be faster than pitching thus reducing the speed variation.

The grid disturbance duration may relate to the time range starting at the voltage drop and ending at the point in time, when the grid voltage resumes for example to at least 90% or 100% of the nominal grid voltage. If the grid disturbance lasts for longer than for example 30 s, further measures may be taken or performed, for example involving pitching out the rotor blades and/or breaking the rotor and/or disconnecting the wind turbine from the grid.

According to an embodiment of the present invention, an aerodynamic lift of the rotor blade and/or an aerodynamic torque is reduced the more the bigger the grid voltage drop.

When there is only a relatively small voltage drop, for example below up to 10% or 20% of the nominal grid voltage, the counter-torque of the generator may not be reduced to zero but may stay at a small value.

E.g. for a 20% drop in grid voltage the maximum power to the grid may decrease by 30%. At the onset of the fault (when speed haven't changed yet) this also means a reduction of the torque by 30%. (As the speed increases but the power is constant the torque drops further)

In this case, it may not be required to reduce the aerodynamic lift to a maximal possible extent, but it may be sufficient to slightly reduce the lift in order to avoid overspeed of the rotor due to too high acceleration. The adapting the airflow regulating system may for example be such that the reduction of the aerodynamic lift is at least substantially proportional to the size of the utility grid voltage drop. Thereby, a response which is individually tailored to different voltage drops may be provided, improving the operation of the wind turbine.

According to an embodiment of the present invention, adapting the airflow regulating system comprises to reduce an aerodynamic lift of the rotor blade and/or an aerodynamic torque acting on the rotor to which the blade is mounted, in particular by between 10% and 70% of a lift or torque, respectively, prior to the disturbance, in particular within a time span between 0.1 s and 3 s, in particular between 0.5 s and 2 s.

For example, when activating a segment of a segmented spoiler provided at a suction side of the rotor blade, the airflow may at least portion-wise be disturbed, to effect a stall of the airflow at this portion(s) of the rotor blade. Depending on the number of segments activated or turned to an on-state, the reduction of the lift may be in a step-wise manner adjusted, for example in the range of 10% to 70% or 20% to 60% or 20% to 50%. Other values of the lift reduction are possible depending on the particular used airflow regulating system and for example depending on the number of segments in case of a segmented spoiler, for example. When the reduction is achieved in a relatively small timespan between 0.1 s and 3 s, a fast response to a utility grid voltage drop may be enabled. Thereby, the risk of overspeed of the rotor may be reduced or even avoided.

According to an embodiment of the present invention, adapting the airflow regulating system comprises to adjust a setting that depends on: at least one operating parameters of the wind turbine; at least one external condition; at least one property of the grid disturbance, the external conditions in particular comprising at least one of: wind velocity, wind turbulence, the operating parameters in particular comprising at least one of: pitch angle of the rotor blade; rotational speed of the rotor; power output.

Depending on the operating parameters, the external condition and/or the property of the grid disturbance, different degrees of a reduction of the aerodynamic lift may be required or set. Furthermore, the change of the lift of the rotor blade may be effected by a movement or a change in position and/or orientation of an active surface element of the airflow regulating system that may be different for different operating parameters of the wind turbine. For example, for any operating point of the wind turbine (including a definition of a number of operating parameters of the wind turbine), there may be a pregiven relationship or characteristics between the aerodynamic lift of the rotor blade and a mechanical setting quantity, for example angle or distance, of an active surface of the airflow regulating system. For example, when the wind turbine is at an operating point where a small change in the mechanical adjustment parameter of the airflow regulating system effects a relatively large change of the aerodynamic lift, the mechanical adjustment value of the airflow regulating system may be changed to a smaller degree than at another operating point, wherein the change of the aerodynamic lift is less for the same change amount of the mechanical adjustment parameter of the airflow regulating system.

Taking operational parameters and/or external conditions and/or property of the grid disturbance into account for adapting the airflow regulating system may further improve the method and ensure a reliable and safe operation of the wind turbine.

According to an embodiment of the present invention, adapting the airflow regulating system is further based on an operating point of the wind turbine, wherein at a first operating point where a setting change of the airflow regulating system has more impact on the lift of the rotor blade, a setting of the airflow regulating system is changed (e.g. position and/or orientation of an active surface is changed) to a smaller degree (less influence on airflow/stall/lift) than at a second operating point where a setting change has less impact on the lift of the rotor blade.

A state or a setting of the airflow regulating system may be defined by the position and/or orientation of one or more active surface portions of the airflow regulating system. For example, in a case of a segmented spoiler, the state or the setting may be defined by the number of segments being in an on-state, i.e. completely tilted outwards, comprising outwards tilted active surface portions, and how many segments are in an off-state, i.e. in a state, wherein the active surface portions are fully retracted such as to not interfere with airflow across the suction side of the wind turbine. In the off-state, the lifting force is not reduced, while in the on-state, the lifting force is removed to a maximal extent.

In case for example of a trailing edge flap, the setting or state may be defined by a continuous value of a mechanical adjustment value, such as amount of moving out the flap or as an angle of tilting the flap, for example. The setting change of the airflow regulating system therefore relates to a change of the mechanical adjustment parameter of one or more active surface portions. This embodiment is also related to a gain scheduling of the adapting the airflow regulating system. Therefore, response to a grid disturbance may be improved for different operating conditions.

According to an embodiment of the present invention, the method further comprises at least for a part of a disturbance duration: keeping a pitch angle of the rotor blade at least substantially unchanged; or the method further comprising, within a disturbance duration: changing a pitch angle of the rotor blade based on the information, in particular in order to reduce the lift of the rotor blade.

Keeping the pitch angle substantially constant, may avoid high loads on the pitch bearings. Keeping the pitch angle of the rotor blade at least substantially unchanged may only be performed in a situation, wherein the aerodynamic lift force may sufficiently be reduced by adapting the airflow regulating system. If this is not possible any more, the pitch angle may additionally be changed in a direction to reduce further the lifting force of the rotor blade. Thereby, responding or reacting to a grid disturbance may further be improved, in particular depending on the gravity of the grid disturbance, in particular grid voltage drop.

According to an embodiment of the present invention, if the grid does not return to normal operation within a predetermined threshold time range, the method comprises: stopping the wind turbine, in particular comprising: adapting the airflow regulating system such that maximum airflow stall is effected; and/or pitching out the rotor blades; and/or breaking the rotor.

In this case, stopping the wind turbine may be required by a grid code or may at least be the safer measure in order to protect components of the wind turbine. Pitching out the rotor blades may involve changing the pitching angle such that the lift is further reduced. Breaking the rotor may involve mechanical breaking or electrical breaking.

According to an embodiment of the present invention, after the grid disturbance the grid restores to a nominal grid status, in particular nominal grid voltage, the method comprises: adapting the airflow regulating system to increase the lift of the rotor blade, in particular to a pre-disturbance lift (and/or pre-disturbance setting of the airflow regulating device) as was present prior to the disturbance, in particular based on at least one of: a grid disturbance duration, a rate at which the (pre-disturbance) power output is re-established, a rotor speed, a pitch angle.

The pre-disturbance lift (and/or pre-disturbance setting of the airflow regulating device) may have been memorized in an electronic storage. Increasing the rotor blade aerodynamic lift may restore the power output of the wind turbine as was present prior to the grid disturbance. The power output may be restored or may at least be increased after the duration of the grid disturbance, by appropriately controlling for example a converter which is connected to the generator. By this control for restoring the wind turbine output power, the generator torque may be in a step-wise manner or continuously increased. In correspondence to this step-wise or continuous increase of the generator torque, also the aerodynamic torque (as effected by the increasing lift of the rotor blade) may be increased, in particular substantially in parallel or in a corresponding manner. Thereby, the rotor speed may appropriately be controlled to reach or stay at a nominal rotor speed.

According to an embodiment of the present invention, adapting the airflow regulating system to the pre-disturbance lift is performed within a time span of between 0.1 s and 3 s, in particular between 0.5 s and 2 s. When the pre-disturbance lift is achieved in this relatively small timespan, the wind turbine output power may also be restored to the pre-disturbance output power. Thereby, efficiency may be improved.

According to an embodiment of the present invention, receiving information regarding the grid disturbance comprises: detecting the grid disturbance; and deriving the information based on the detected grid disturbance. The grid disturbance may for example be detected by comparing a measured grid voltage with a nominal grid voltage. The detecting the grid disturbance may for example also be performed by a wind turbine controller or by a measurement or monitoring system, for example external or internal to the wind turbine. The information may for example comprise the characteristic of the grid disturbance, for example whether the grid disturbance is a voltage drop, a frequency drop, or the like. Furthermore, the information may comprise information regarding the value or the amount of the voltage drop or the severity of the grid disturbance.

According to an embodiment of the present invention, airflow regulating system comprises at least one of: a flap, in particular arranged at a trailing edge of the rotor blade; a, in particular segmented, spoiler arranged at a suction surface of the blade, wherein the airflow regulating system is different from a pitch angle changing system.

Thereby, conventionally available regulating systems may be supported. The spoiler may for example comprise five to ten segments which are arranged side by side along the longitudinal direction of the rotor blade and provided at or mounted at the suction side of the rotor blade.

It should be understood, that features, individually or in any combination, disclosed, described, explained or provided for a method of operating at least one adaptable airflow regulating system may also be applicable (individually or in any combination) to an arrangement for operating at least one adaptable airflow regulating system according to embodiments of the present invention and vice versa.

According to an embodiment of the present invention it is provided an arrangement for operating at least one adaptable airflow regulating system of at least one rotor blade of a wind turbine connected to a utility grid in case of a grid disturbance, the arrangement comprising: a processor adapted to derive a control signal based on information regarding the grid disturbance, in order to adapt, during a disturbance duration, the airflow regulating system, wherein adapting the airflow regulating system (13) comprises moving position and/or orientation of at least one aerodynamically active surface of the airflow regulating system relative to an airfoil portion of the rotor blade.

The arrangement may for example be a portion of a wind turbine controller. According to an embodiment of the present invention, the arrangement may further comprise an actuator which may be configured to receive the control signal and effect an adjustment of the position and/or orientation of at least one active surface portion of the airflow regulating system. For example, the actuator may comprise a compressor which may be connected to a hose which may cause, upon inflation or deflation change of the position and/or orientation of an active surface portion of the airflow regulating system, such as a spoiler or a trailing edge flap.

According to an embodiment of the present invention it is further provided a wind turbine, comprising: a wind turbine nacelle; a rotor shaft harboured in the nacelle, at which rotor shaft plural rotor blades are mounted, at least on rotor blade having at least one adaptable airflow regulating system; and an arrangement according to the preceding embodiment connected to control the airflow regulating system.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which embodiments of the invention are not limited.

BRIEF DESCRIPTION

Some of the embodiments will be described in detail, with reference to the following figures, wherein like designations denote like members, wherein:

FIG. 1 schematically illustrates a wind turbine according to an embodiment of the present invention comprising an arrangement according to an embodiment of the present invention; and FIG. 2 illustrates a method scheme of operating at least one adaptable airflow regulating system of at least one rotor blade of a wind turbine connected to a utility grid, in case of a grid disturbance, as e.g. performable by the arrangement illustrated in FIG. 1.

DETAILED DESCRIPTION

The illustration in the drawings is in schematic form.

The wind turbine 1 schematically illustrated in FIG. 1 comprises a wind turbine tower 3 which is erected at a not illustrated base. The wind turbine further comprises a nacelle 5 which is rotatably mounted on top of the wind turbine tower 3. The wind turbine nacelle 5 comprises a rotor shaft 7 (having an axis 8) which is installed within the nacelle 5. The rotor shaft drives a generator 9 which generates electric energy which is supplied to a converter 11 which converts the variable frequency AC power stream to a substantially fixed frequency power stream which is provided to a wind turbine transformer which transforms the output voltage to a higher value.

The wind turbine 1 further comprises an arrangement 20 of controlling at least one adaptable airflow regulating system 13 which is provided at at least one wind turbine blade 15. Therein, the rotation shaft 7 has a hub 17 at which plural rotor blades 15 (having blade tip 25) are mounted, via blade root 12. At least one rotor blade has a flow regulating system 13.

In the illustrated embodiment, the flow regulating system comprises a segmented spoiler having spoiler segments 19a, 19b, 19c, 19d, 19e, 19f which are arranged on a suction side 14 along a longitudinal axis 21 of the rotor blade 15. The airflow regulating system 13 may further comprise at least one flap at a trailing edge 16, wherein flaps are indicated with reference sign 23.

The arrangement 20 is adapted to control the adaptable airflow regulating system 13. Thereby, the arrangement 20 performs a method 30 as is illustrated in FIG. 2. In a method step 31, information is received regarding a grid disturbance. Therein, the information may for example be received from an operator of the utility grid 6, wherein the information is denominated in FIG. 1 with reference sign 10 as received via a signal line 41 by the arrangement 20.

The arrangement 20 illustrated in FIG. 1 comprises a not illustrated processor which is configured to perform a method of regulating or adapting the airflow regulating system 13 according to an embodiment of the present invention. In a method step 33, the airflow regulating system (for example system 13 in FIG. 1) is adapted (or adjusted or set in a particular state) based on the information 10, while the wind turbine stays connected to the utility grid. Thus, the wind turbine 1 provides AC power output 18 via a power line 22 to the utility grid 6.

The arrangement 20 may for example be arranged within the hub 17 of the wind turbine or may be arranged within the nacelle 5 depending on the application.

The arrangement 20 then controls the flow regulating system 19a, 19b, 19c, 19d, 19e, 19f and/or 23 by supplying appropriate control signals, for example via a control line 47 to the individual segments 19a, . . . , 19f and control lines 48 to flaps 23. These segments 19a-19f may then individually turned on or off, for example if they comprise two distinguished or discrete states. In other embodiments, additionally or alternatively, a continuous adaptation of the flow regulating device 13 may be performed, for example by continuously moving an orientation and/or position of the trailing edge flaps 23. By controlling the airflow regulating system 13 by the arrangement 20, an appropriate reaction or response to a disturbance in the utility grid 6 may be achieved.

Each of the spoiler segments 19a, . . . , 19s has a respective aerodynamically active surface which is exposed to the airflow around or across (suction side 14 of) the rotor blade 15. This active surface is moved regarding position and/or orientation due to the control signals supplied from the arrangement 20. For example, in an on-state, the active surface may be flipped out to a particular degree, for example using an inflated hose arranged below the active surface. In an off-state for example, the active surface may be flipped in such that the surface is completely retracted, to not disturb or influence an airflow across the suction side surface 14 of the rotor blade 15.

Embodiments of the present invention utilize active blade add-ons to unload the rotor of the wind turbine whenever a grid event is detected that may require reduction of the generator torque or which will reduce the generator torque.

The conventionally used pitch system for adapting the lift of the rotor blades may be relatively slow compared to an airflow regulating system installed at or on the rotor blade surface. Generally, time constants of pitching systems may be larger which make larger turbines become prone to such events as a grid drop.

Active blade add-ons, such as airflow regulating system 13, including spoiler(s) and/or trailing edge flaps may make a significant change to the lifting force of the rotor in a very short time. Therefore, the effect of a grid drop can be compensated faster than by applying a pitching regulation, especially if the pitching system has limited capabilities (or can be made cheaper not to have such high demands). Similarly, the lift change, i.e. the aerodynamic change of the lifting force effected by the rotor blade, can be quickly negated after the fault, to re-establish full power production.

The utility grid 6 has a nominal grid voltage. During a grid disturbance, the voltage may drop considerably, for example between 0% and 100% of a nominal grid voltage. Methods according to embodiments of the present invention may handle a situation when the voltage drop is for example between 0% and 50% of a nominal grid voltage. By operating the airflow regulating system 13, the lifting force may be reduced for example by between 10% and 70% of the lift prior to the grid disturbance.

The wind turbine 1 further comprises a not in detail illustrated pitching system 40 which is capable of changing the pitch angle of each of the rotor blades 15, i.e. setting a particular rotational angle a around the longitudinal axis 21 of the respective rotor blade 15. According to embodiments of the present invention, only the airflow regulating system 13 is adapted but not the pitching system 40 is activated in order to respond to a grid disturbance.

In other embodiments, both the airflow regulating system 13 is adapted as well as the pitching system 40 is activated in order to set the rotor blade including the airflow regulating system 13 into a state, where the lifting force is considerably reduced, in dependence of the severity of the grid disturbance and other operational parameters of the wind turbine.

In the following, particular implementations of a method according to embodiments is described, to which embodiments of the invention is however not limited:

1) Detect a grid fault.
2) Apply active blade add-ons (to remove lift from the rotor blade) to unload the turbine rotor 7
   the action from active blade add-ons may happen in addition or instead of pitching.

The action from active blade add-ons may be scheduled by gain scheduling such that the impact is adjusted to the operating point, e.g. apply smaller change at operating points where the add-on has a higher impact (gain) on the lift/torque/thrust of the rotor or the aerodynamics of the rotor.

3) Remove the action from the blade add-ons if the grid returns to normal operation the removal of the blade add-ons action may be scheduled based on grid fault duration, the rate that the power is re-established, rotor speed and pitch angle if the grid does not return to normal operation, then the turbine will stop and action for the blade add-ons can be removed.

Embodiments of the present invention may provide the following advantages:

The grid drop load case can be design-driven and may cause added cost to the wind turbine, because the wind turbine needs either to be able to pitch faster following a grid voltage drop or withstand the additional extreme loads resulting from the grid disturbance event. Introducing a handle to reduce the impact of the grid drop may lead to a cheaper design with less loading.

The likelihood of driving the turbine into an overspeed event, i.e. rotor overspeed event, or expose it to ultimate loads, following a grid drop may be reduced by this additional control handle to adapt the airflow regulating system.

Costs may be reduced because the hydraulic or electrical pitch system capabilities may be reduced.

Improved ability to produce cost-competitive wind turbines.

Improved capability to fulfil strict grid codes requirements on re-establishing of power production.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating at least one adaptable airflow regulating system of at least one rotor blade of a wind turbine connected to a utility grid, the method comprising:
receiving information regarding a grid disturbance;
adapting, during a disturbance duration, the at least one adaptable airflow regulating system based on the information, while the wind turbine stays connected to the utility grid, wherein controlling the at least one adaptable airflow regulating system comprises:
moving a position and/or an orientation of at least one aerodynamically active surface of the at least one adaptable airflow regulating system relative to an airfoil portion of the at least one rotor blade;
wherein adapting the at least one adaptable airflow regulating system is further based on operating points of the wind turbine such that a degree of change to a setting of the airflow regulating system is determined based on an impact on a lift of the at least one rotor blade at a specific operating point, further wherein, at a first operating point where a change to the setting of the airflow regulating system has more impact on the lift of the at least one rotor blade than a change to the setting of the airflow regulating system at a second operating point, the degree of change to the setting is smaller at the first operating point than the degree of change at the second operating point.

2. The method according to claim 1, wherein the grid disturbance comprises a grid voltage drop of a grid voltage, the grid voltage drop reducing the grid voltage to between 0% and 50% of a nominal grid voltage, for a duration between 0.1 s and 10 s, further wherein adapting the airflow regulating system is performed, only if the grid voltage drop is greater than a threshold.

3. The method according to claim 1, wherein an aerodynamic lift of the at least one rotor blade and/or an aerodynamic torque is, due to an adaptation of the at least one adaptable airflow regulating system, reduced the bigger a grid voltage drop.

4. The method according to claim 1, wherein adapting the at least one adaptable airflow regulating system comprises reducing an aerodynamic lift of the at least one rotor blade and/or an aerodynamic torque acting on a rotor to which the at least one rotor blade is mounted by between 10% and 70% of a lift or a torque, respectively, prior to the grid disturbance, within a time span between 0.1 s and 3 s.

5. The method according to claim 1, wherein adapting the at least one adaptable airflow regulating system comprises adjusting a setting that depends on at least one of:
at least one operating parameters of the wind turbine;
at least one external condition;
at least one property of the grid disturbance,
the external conditions comprising at least one of:
wind velocity, and
wind turbulence; and
the at least one operating parameters comprising at least one of:
pitch angle of the at least one rotor blade;
rotational speed of the rotor; and
power output.

6. The method according to claim 1, further comprising at least for a part of the disturbance duration:
keeping a pitch angle of the at least one rotor blade at least substantially unchanged; or the method further comprising, within the disturbance duration:
changing a pitch angle of the at least one rotor blade based on the information to reduce a lift of the at least one rotor blade.

7. The method according to claim 1, wherein, if the grid does not return to normal operation within a predetermined threshold time range, the method further comprises:
stopping the wind turbine, by:
adapting the at least one adaptable airflow regulating system such that a maximum airflow stall is effected; and/or
pitching out the at least one rotor blade; and/or
breaking a rotor.

8. The method according to claim 1, wherein, after the grid disturbance the grid restores to a nominal grid status which has a nominal grid voltage, the method further comprises:
adapting the at least one adaptable airflow regulating system to increase a lift of the at least one rotor blade to a pre-disturbance lift as was present prior to the grid disturbance, based on at least one of:
a grid disturbance duration,
a rate at which a pre-disturbance power output is re-established,
a rotor speed, and
a pitch angle.

9. The method according to claim 8, wherein adapting the at least one adaptable airflow regulating system to the pre-disturbance lift is performed within a time span of between 0.1 s and 3 s.

10. The method according to claim 1, wherein receiving information regarding the grid disturbance comprises:
    detecting the grid disturbance; and
    deriving the information based on the detected grid disturbance.

11. The method according to claim 1, wherein the at least one adaptable airflow regulating system comprises at least one of:
    a flap arranged at a trailing edge of the at least one rotor blade;
    a segmented spoiler arranged at a suction surface of the at least one rotor blade, wherein the at least one adaptable airflow regulating system is different from a pitch angle changing system.

12. An arrangement for operating at least one adaptable airflow regulating system of at least one rotor blade of a wind turbine connected to a utility grid in case of a grid disturbance, the arrangement comprising:
    a processor adapted to derive a control signal based on the information regarding the grid disturbance in order to adapt, during a disturbance duration, the at least one adaptable airflow regulating system,
    wherein adapting the at least one adaptable airflow regulating system comprises:
    moving a position and/or an orientation of at least one aerodynamically active surface of the at least one adaptable airflow regulating system relative to an airfoil portion of the at least one rotor blade;
    wherein adapting the at least one adaptable airflow regulating system is further based on operating points of the wind turbine such that a degree of change to a setting of the airflow regulating system is determined based on an impact on a lift of the at least one rotor blade at a specific operating point, further wherein, at a first operating point where a change to the setting of the airflow regulating system has more impact on the lift of the at least one rotor blade than a change to the setting of the airflow regulating system at a second operating point, the degree of change to the setting is smaller at the first operating point than the degree of change at the second operating point.

13. A wind turbine, comprising:
    a wind turbine nacelle;
    a rotor shaft harboured in the nacelle, at which a plurality of rotor blades are mounted, at least one rotor blade having at least one adaptable airflow regulating system; and
    the arrangement according to claim 12 connected to control the at least one adaptable airflow regulating system.

* * * * *